(No Model.)
J. BRUSIE.
BICYCLE.
No. 359,127. Patented Mar. 8, 1887.
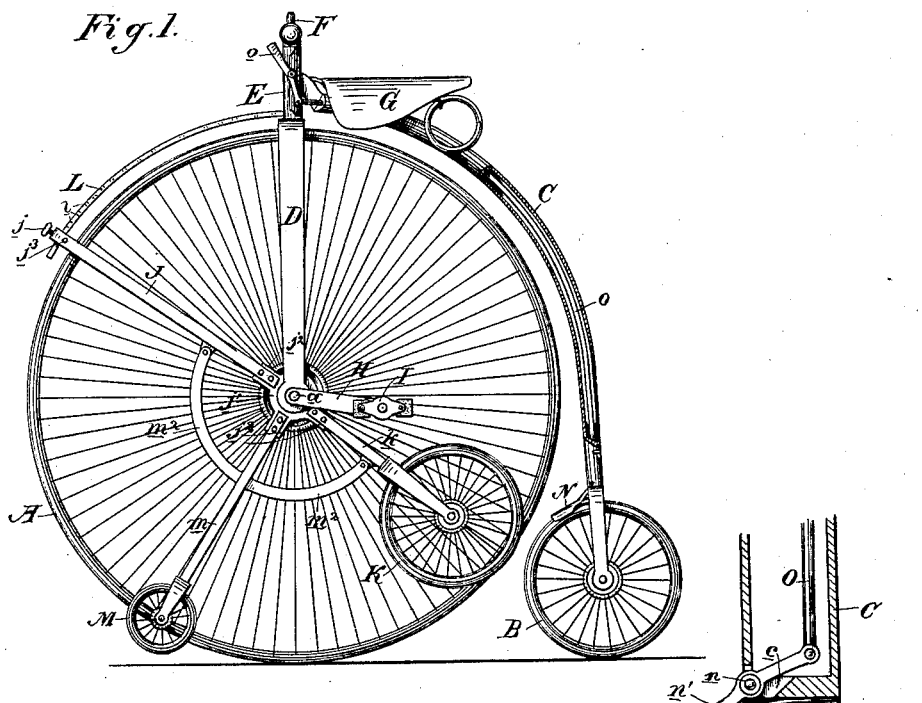
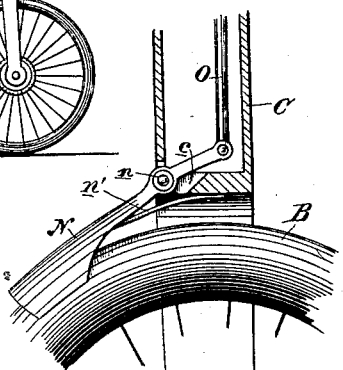
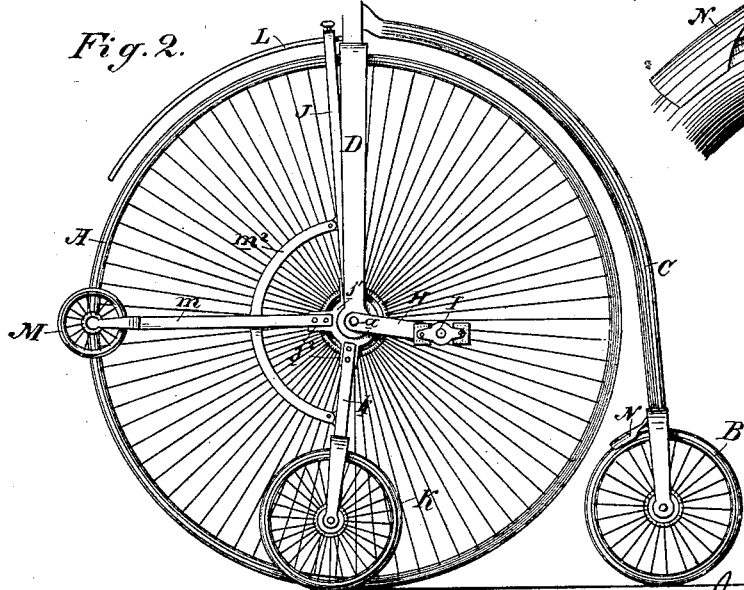
Witnesses,
Inventor
Jas Brusie
By Deneyr
atty

UNITED STATES PATENT OFFICE.

JAMES BRUSIE, OF OAKLAND, CALIFORNIA.

BICYCLE.

SPECIFICATION forming part of Letters Patent No. 359,127, dated March 8, 1887.

Application filed September 24, 1886. Serial No. 214,464. (No model.)

*To all whom it may concern:*

Be it known that I, JAMES BRUSIE, of Oakland, Alameda county, State of California, have invented an Improvement in Bicycles; and I hereby declare the following to be a full, clear, and exact description of the same.

My invention relates to the class of bicycles; and my invention consists in the construction and combination of devices which I shall hereinafter describe and claim.

The object of my invention is to prevent those accidents known among wheelmen as "headers," and which result from any sudden stoppage of the machine or unusual forward lurch of the rider, whereby the frame of the machine travels forward around its pivotal center on the axle, and thus carries the rider beyond the center of gravity.

Referring to the accompanying drawings for a more complete explanation of my invention, Figure 1 is a side elevation of a bicycle, showing the guard-wheel ready for use. Fig. 2 is a side elevation showing the guard-wheel raised out of the way. Fig. 3 is a detail view showing the brake N.

A is the large wheel of the bicycle. B is the usual small wheel. C is the backbone. D are the forks. E is the head or steering-center. F is the handle-bar. G is the saddle; H, the cranks, and I are the treadles.

J is a lever pivoted or journaled on the axle $a$ of the front wheel in any suitable position, as between the hub-flange of the wheel and the bearings of the axle. The lever J fits over and is guided at its upper end by a bar, L, which is secured to the forks or to the head of the machine in some manner. It is bent to the curvature of the wheel A, and may be provided with a series of holes or indentations, $l$, which are for the purpose of receiving the set-screw or spring-bolt $j$ in the upper end of the lever J, so that said lever may be adjusted and fixed in any desired position. To further guide the lever, and also to provide a support for the curved guide-bar L, so that it will not have a tendency to settle down upon the tire of the wheel A, I pass a small pin or bolt, $j^3$, transversely through the upper portion of the lever under the curved guide-bar.

Connected or formed with the hub or lower end of lever J is an arm or bar, $m$, extending at about right angles to said lever and forming with said lever an elbow or bell-crank pivoted at its angle. The arm $m$ carries on its lower end the small guard-wheel M, which normally remains above the ground and forward of the vertical center of the main wheel A. Though I may form the arm and lever integral, I prefer to have them separate and connect them at $j^2$ by means of bolts and nuts, thus providing for the ready application and removal of the small guard-wheel. To strengthen the connection, I may have braces $m^2$.

Now it will be seen that when the lever J is connected with the guide-bar L, by means of its set-screw or spring-bolt $j$, the connection of the guard-wheel M with the forks of the machine is complete. Therefore, when there is a tendency to a header and the forks move forward on their pivotal centers, the lever J is depressed, whereby the arm $m$ is moved down and the guard-wheel M comes in contact with the ground and stops the forks, whereby the header is prevented.

Whenever it is desired to raise the guard-wheel up high enough to be entirely out of the way and not in use, the lever J is moved up on the guide-bar L and secured wherever desired. This simply provides for the adjustment of the guard-wheel. If said wheel were to be left in position all the time, it is apparent that the connection between the lever J and the bar L might be a fixed one; but I prefer the adjustable connections I have shown, not only on account of their simplicity and practicability, but also because they provide for the simultaneous use of my auxiliary side wheels, K, which I have described in my previous application, and which I herein illustrate, showing their connection with the lever J, which has an extension, $k$, beyond its pivotal center, in order to carry said wheels. These wheels K, I may here state briefly, are for the purpose of holding the machine upright to enable the rider to safely mount and dismount, and they are operated by the movement of lever J, being thrown down to the ground for use and elevated again when not in use. It will be seen by reference to Fig. 1 that when the guard-wheel M is in use during the travel of the machine, the side wheels, K, are elevated out of the way, and, by reference to Fig. 2, that when the side wheels are in use there is no use for the guard-wheel, so that the entire construction is well adapted for all ends in view.

Though, as I have said, the lever J may be considered as including in an integral piece the arm $m$ and the extension $k$, which carries the side wheels, K, I prefer, in practice, to divide it up into four pieces, as I have shown, the central one being the hub $j'$, journaled on the axle and formed with three flanges or wings, $j^2$, to which the lever, the arm, and the extension are each bolted, whereby they may all be applied and removed at will.

The employment of the curved bar L over the large or main wheel obviously prevents the use of the spoon-brake in its usual position on top of said wheel. I therefore change the brake N to the small or rear wheel, B, of the bicycle, pivoting it to a collar or ear, $n$, on the lower end of the backbone, just above the rear forks. Its rear end extends through a slot, $c$, into the hollow or tubular backbone, and has connected with it a rod, wire, or cord, O, which passes up through the backbone and emerges from its top beside the neck of the machine, where it is connected with a lever, $o$, pivoted to a suitable portion of the head. A spring, $n'$, holds the brake normally out of action. By operating the lever $o$ the brake is applied to the tire of the rear wheel, B.

Having thus described my invention, what I claim as new, and desire to secure by Letters Patent, is—

1. In combination with a bicycle, a guard-wheel located forward of the vertical center of the main or large wheel, and an adjustable connection, comprising an elbow or bell-crank lever between said wheel and the head or forks or other portion of the frame of the machine, whereby said wheel may be set in the desired proximity to the ground or raised up out of the way, substantially as herein described.

2. In combination with a bicycle, an elbow or bell-crank lever pivoted at its angle upon the axle of the main or large wheel of the machine, a guard-wheel mounted in the end of the lower arm of the said lever, forward of the vertical center of the main or large wheel and in proximity to the ground, and a bar connecting the end of the upper arm of said lever with the head or forks of the machine, substantially as and for the purpose herein described.

3. In combination with a bicycle, the lever J, pivoted on the axle of the main or large wheel of the machine, the arm $m$, formed or connected with said lever, the guard-wheel M, mounted in the lower end of the arm, forward of the vertical center of the main wheel and near the ground, and the curved bar L, secured to the head or forks of the machine and to the lever J, substantially as and for the purpose herein described.

4. In combination with a bicycle, the lever J, pivoted on the axle of the main or large wheel of the machine, the arm $m$, extending at right angles from said lever and formed or connected with its lower end, the guard-wheel M, mounted in the lower end of the arm, near the ground and forward of the vertical center of the main wheel, the curved guide-bar L, over which the upper end of the lever J is fitted and adapted to slide, said bar being secured to the head or forks of the machine, and the set-screw or spring-bolt $j$, by which the lever is fixed on the bar in the position to which it is adjusted, substantially as and for the purpose herein described.

5. In combination with a bicycle, the lever J, pivoted on the axle of the main or large wheel of the machine, the side wheels, K, mounted in the lower end of the lever, the arm $m$, secured to or formed with said lever, the guard-wheel M, carried by the lower end of said arm, as described, the curved guide-bar L, over which the upper end of lever J is fitted and moves, said bar being secured to the forks or head of the machine, and the set-screw $j$, by which the lever J is connected with the bar L, all arranged and adapted to operate substantially as herein described.

6. In combination with a bicycle, the hub $j'$, pivoted or journaled upon the axle of the main or large wheel of the machine, and having the three wings or flanges $j^2$, the lever J, bolted to one of said flanges, the arm $m$, bolted to the second, and the extension $k$, bolted to the third, the curved bar L, secured to the head or forks of the machine, and upon which the lever J is guided and secured, the wheel M, carried by arm $m$, and the wheels K, carried by extension $k$, substantially as herein described.

In witness whereof I have hereunto set my hand.

JAMES BRUSIE.

Witnesses:
S. H. NOURSE,
H. C. LEE.